United States Patent
Miyamoto (10) Patent No.: US 10,537,988 B2
(45) Date of Patent: Jan. 21, 2020

(54) CONTROLLER, ROBOT AND ROBOT SYSTEM

(71) Applicant: Seiko Epson Corporation, Tokyo (JP)

(72) Inventor: Yoshito Miyamoto, Matsumoto (JP)

(73) Assignee: Seiko Epson Corporation (JP)

( * ) Notice: Subject to any disclaimer, the term of this patent is extended or adjusted under 35 U.S.C. 154(b) by 196 days.

(21) Appl. No.: 15/704,160

(22) Filed: Sep. 14, 2017

(65) Prior Publication Data

US 2018/0071911 A1 Mar. 15, 2018

(30) Foreign Application Priority Data

Sep. 15, 2016 (JP) .................... 2016-180254

(51) Int. Cl.
*B25J 9/00* (2006.01)
*B25J 9/16* (2006.01)
*G05B 19/423* (2006.01)

(52) U.S. Cl.
CPC .......... *B25J 9/0081* (2013.01); *B25J 9/1602* (2013.01); *B25J 9/1687* (2013.01); *G05B 19/423* (2013.01)

(58) Field of Classification Search
CPC ...... B25J 9/0081; B25J 9/1633; B25J 9/1687; B25J 9/1602; G05B 2219/40032; G05B 19/423
See application file for complete search history.

(56) References Cited

U.S. PATENT DOCUMENTS

| | | | | |
|---|---|---|---|---|
| 9,804,593 | B1* | 10/2017 | Davis | G05B 19/423 |
| 9,868,215 | B2* | 1/2018 | Suzuki | G06K 9/00664 |
| 10,220,513 | B2* | 3/2019 | Shimodaira | B25J 13/085 |
| 2018/0111266 | A1* | 4/2018 | Okada | B25J 9/161 |

FOREIGN PATENT DOCUMENTS

| | | |
|---|---|---|
| JP | 04-286541 A | 10/1992 |
| JP | 05-338807 A | 12/1993 |
| JP | 08-147024 A | 6/1996 |
| JP | 2549139 B2 | 10/1996 |

* cited by examiner

*Primary Examiner* — Bickey Dhakal
(74) *Attorney, Agent, or Firm* — Harness, Dickey & Pierce, P.L.C.

(57) ABSTRACT

A controller includes a processor that is configured to execute computer-executable instruction so as to control a robot including a movable section and a force detecting section provided in the movable section, wherein the processor is configured to sense that a first portion of a first target object has come into contact with a second target object and then sense that a second portion of the first target object has come into contact with the second target object based on an output from the force detecting section, cause the movable section to move in a first direction, sense that a third portion of the first target object has come into contact with the second target object, store first information in a storage section, and generate data on teaching to the movable section based on the first information.

20 Claims, 9 Drawing Sheets

CONTROLLER, ROBOT AND ROBOT SYSTEM

BACKGROUND

1. Technical Field

The present invention relates to a controller, a robot, and a robot system.

2. Related Art

There is a known industrial robot of related art including a robot arm and an end effector attached to the distal end of the robot arm. The robot performs a variety of types of work, such as grasping, transporting, and assembling a target object.

Such a robot is caused to undergo teaching performed by a controller before the robot actually performs work. For example, assuming that a robot performs work having a step called palletizing in which a hand that is an end effector grasps a target object and places the target object in one of a plurality of recesses provided in a pallet, the robot arm is caused to undergo teaching of the position of each of the recesses of the pallet (see Related Art of JP-A-8-147024, for example). The teaching to the robot is so performed that an operator operates the robot and gradually moves the robot arm while visually inspecting the robot. Instead, another teaching method includes teaching a plurality of reference points in a work area and calculating a palletizing position with respect to the reference points (see JP-A-8-147024, for example). In each of the methods described above, the operator teaches the robot while visually inspecting the robot.

A controller used in the related art described above cannot precisely perform the teaching in some cases because the operator teaches the robot while visually inspecting the robot and the teaching therefore varies depending on an operator. Further, in a case where the distance from the target object to the recesses of the pallet is small, it is difficulty to perform the teaching. Moreover, in a case where there is no space for the visual inspection, the teaching cannot be performed. Further, the teaching to the robot undesirably requires a large amount of effort and time.

SUMMARY

An advantage of some aspects of the invention is to solve at least a part of the problems described above, and the invention can be implemented as the following forms or application examples.

A controller according to an aspect of the invention is a controller includes a processor that is configured to execute computer-executable instruction so as to control a robot including a movable section and a force detecting section provided in the movable section, wherein the processor is configured to cause the movable section to cause a first portion of a first target object to approach a second target object, sense that the first portion has come into contact with the second target object based on an output from the force detecting section, then cause the movable section to cause a second portion of the first target object to approach the second target object, and sense that the second portion has come into contact with the second target object based on an output from the force detecting section, cause the movable section to move in a first direction, sense that a third portion of the first target object has come into contact with the second target object based on an output from the force detecting section, store first information containing a first position of the first target object in a storage section, cause the movable section to move in a second direction different from the first direction, sense that a fourth portion of the first target object has come into contact with the second target object based on an output from the force detecting section, store second information containing a second position of the first target object in the storage section, and generate data on teaching to the movable section based on the first information and the second information stored in the storage section.

According to the controller of the aspect of the invention, the teaching to the robot can be readily, quickly, and precisely performed, whereby the robot controlled by the controller of the aspect of the invention can precisely perform work.

In the controller according to the aspect of the invention, it is preferable that the second direction is a direction opposite the first direction.

The teaching to the robot can therefore be readily, quickly, and precisely performed.

In the controller according to the aspect of the invention, it is preferable that, during the movement of the movable section in the first direction, the first portion and the second portion are in contact with the second target object.

The teaching to the robot can therefore be readily, quickly, and precisely performed.

In the controller according to the aspect of the invention, it is preferable that the second target object is a pallet.

Teaching to the robot that performs work of placing the first target object on the pallet and work of removing the first target object placed on the pallet can therefore be readily, quickly, and precisely performed.

In the controller according to the aspect of the invention, it is preferable that the third portion of the first target object is a first side surface of the first target object.

The teaching to the robot can therefore be readily, quickly, and precisely performed.

In the controller according to the aspect of the invention, it is preferable that the fourth portion of the first target object is a second side surface of the first target object that differs from the first side surface of the first target object.

The teaching to the robot can therefore be readily, quickly, and precisely performed.

In the controller according to the aspect of the invention, it is preferable that the second target object has a recess having an inner side surface having a first corner and a second corner different from the first corner, that the portion which forms the second target object and with which the third portion comes into contact is the first corner, and that the portion which forms the second target object and with which the fourth portion comes into contact is the second corner.

Therefore, the first target object is allowed to readily, quickly, and precisely come into contact with the first corner of the second target object. Similarly, the first target object is allowed to readily, quickly, and precisely come into contact with the second corner of the second target object.

In the controller according to the aspect of the invention, it is preferable that the first target object has an outer side surface having a first corner and a second corner different from the first corner, that the third portion of the first target object is the first corner, and that the fourth portion of the first target object is the second corner.

Therefore, the first corner of the first target object is allowed to readily, quickly, and precisely come into contact with the first corner of the second target object. Further, the second corner of the first target object is allowed to readily, quickly, and precisely come into contact with the second corner of the second target object.

In the controller according to the aspect of the invention, it is preferable that the second target object has a plurality of recesses, that the processor is configured to acquire the first information and the second information for at least three of the plurality of recesses and generate teaching data to the movable section based on the first information and second information, and generate teaching data to the movable section for recesses out of the plurality of recesses but different from the recesses for which the teaching data to the movable section has been determined, on the basis of the teaching data for the recesses for which the teaching data to the movable section has been determined.

Therefore, teaching to the robot only needs to be performed for at least three out of the plurality of recesses, whereby the teaching to the robot can be more readily and quickly performed.

In the controller according to the aspect of the invention, it is preferable that the processor is configured to set a local coordinate system having an axis perpendicular to a predetermined surface of the second target object.

The robot can therefore be readily controlled in actual work.

In the controller according to the aspect of the invention, it is preferable that the processor is configured to cause the movable section to cause the first portion to approach the second target object after direct teaching is so performed on the robot that the movable section is moved.

The teaching to the robot can therefore be more quickly performed.

A controller according to another aspect of the invention is a controller includes a processor that is configured to execute computer-executable instruction so as to control a robot including a movable section and a force detecting section provided in the movable section, wherein the processor is configured to cause the movable section to cause a first portion of a first target object to approach a second target object, sense that the first portion has come into contact with the second target object based on an output from the force detecting section, then cause the movable section to cause a second portion of the first target object to approach the second target object, sense that the second portion has come into contact with the second target object based on an output from the force detecting section, move the movable section in a first direction, sense that a first portion of the movable section has come into contact with the second target object based on an output from the force detecting section, store first information containing a first position of the movable section in a storage section, move the movable section in a second direction different from the first direction, sense that a second portion of the movable section has come into contact with the second target object based on an output from the force detecting section, store second information containing a second position of the movable section in the storage section, and generate teaching data to the movable section based on the first information and the second information stored in the storage section.

According to the controller of the aspect of the invention, the teaching to the robot can be readily, quickly, and precisely performed, whereby the robot controlled by the controller of the aspect of the invention can precisely perform work.

A robot according to another aspect of the invention is controlled by the controller according to the aspect of the invention and includes the movable section and the force detecting section.

The controller that controls the robot according to the aspect of the invention can readily, quickly, and precisely perform the teaching to the robot, whereby the robot according to the aspect of the invention can precisely perform work.

A robot system according to another aspect of the invention includes the controller according to the aspect of the invention, and the robot controlled by the controller and including the movable section and the force detecting section.

According to the controller that controls the robot system of the aspect of the invention, the teaching to the robot can be readily, quickly, and precisely performed, whereby the robot of the robot system of the aspect of the invention can precisely perform work.

BRIEF DESCRIPTION OF THE DRAWINGS

The invention will be described with reference to the accompanying drawings, wherein like numbers reference like elements.

DESCRIPTION OF EXEMPLARY EMBODIMENTS

A controller, a robot, and a robot system according to embodiments of the invention will be described below in detail with reference to the accompanying drawings.

First Embodiment

Robot System

Figure 1:
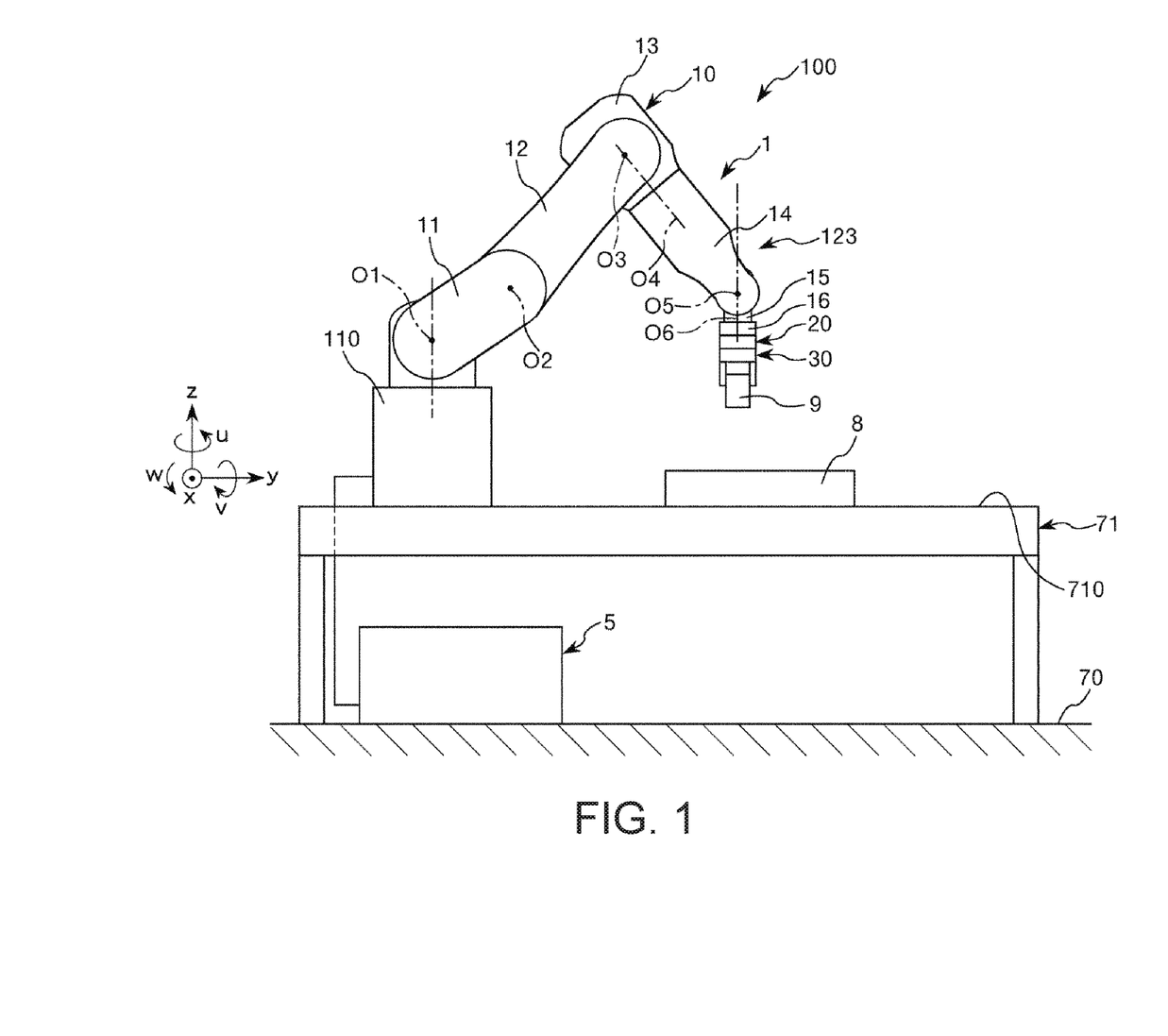
FIG. 1 is a schematic side view showing a robot system according to a first embodiment of the invention.
Figure 2:
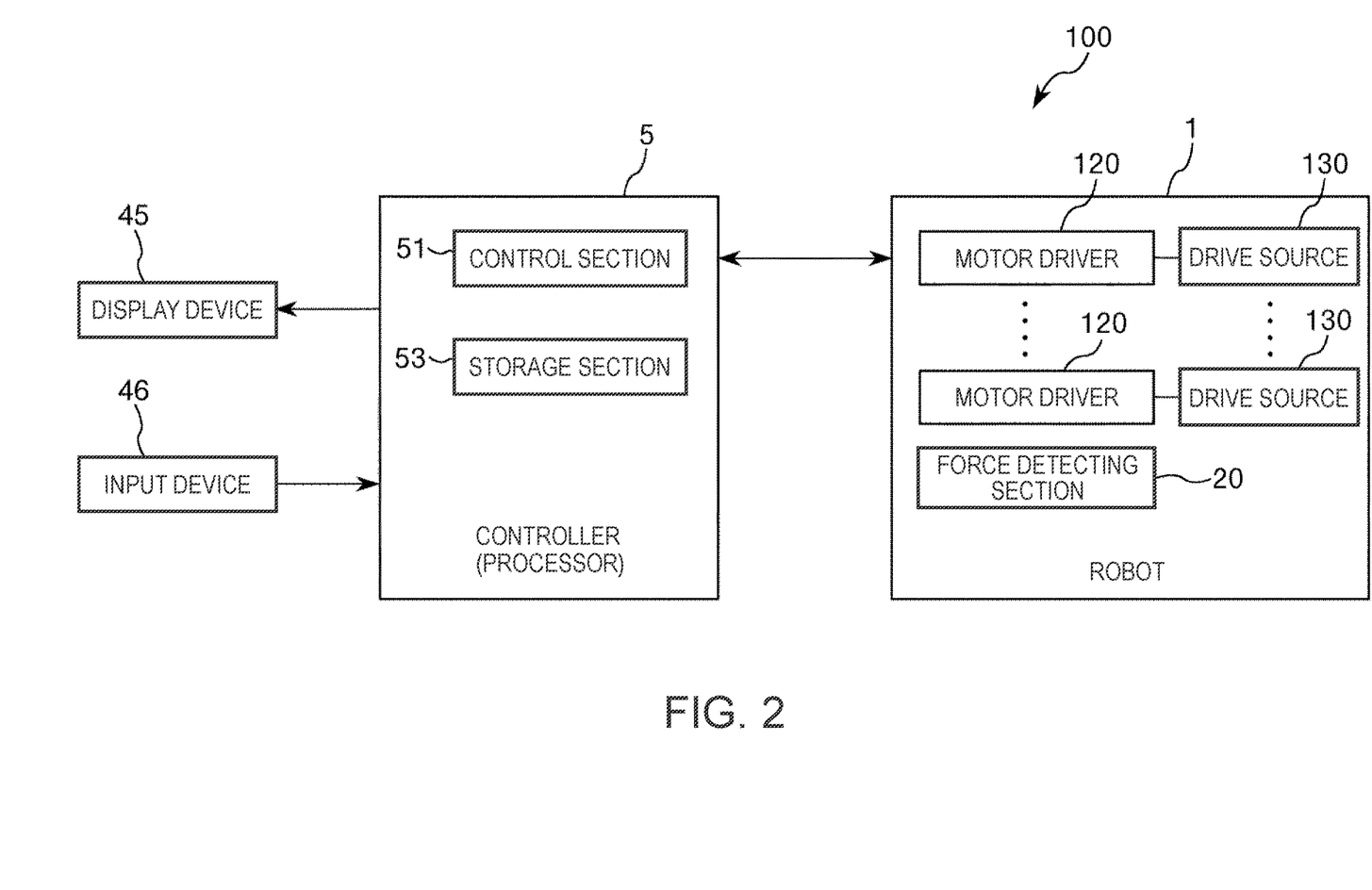
FIG. 2 is a block diagram of the robot system shown in FIG. 1.
Figure 3:
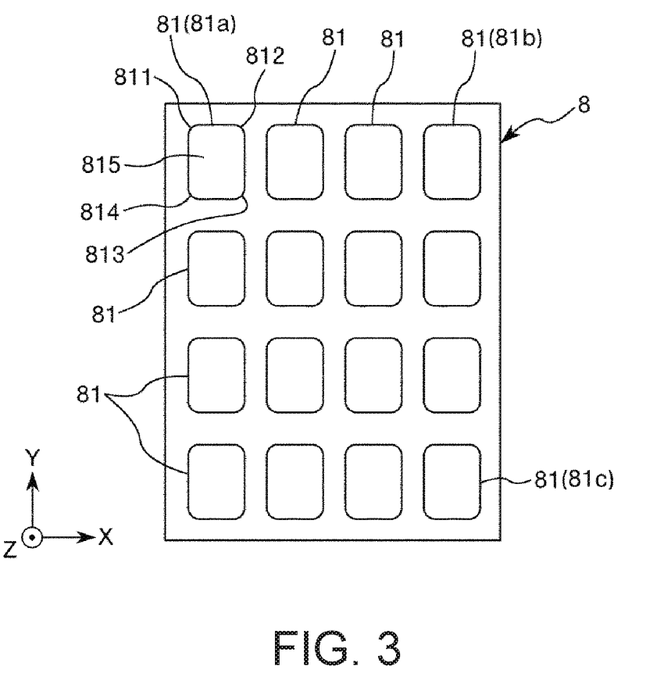
FIG. 3 is a plan view showing a first target object used in work performed by a robot of the robot system shown in FIG. 1.
Figure 4:
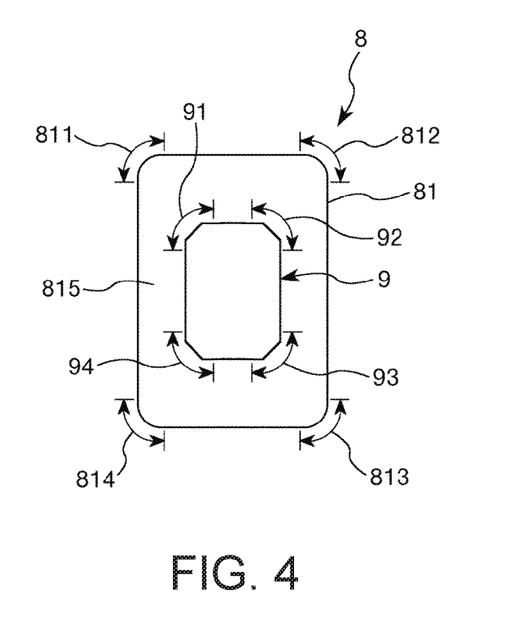
FIG. 4 is a plan view showing a recess of the first target object and a second target object used in the work performed by the robot of the robot system shown in FIG. 1.
Figure 11:
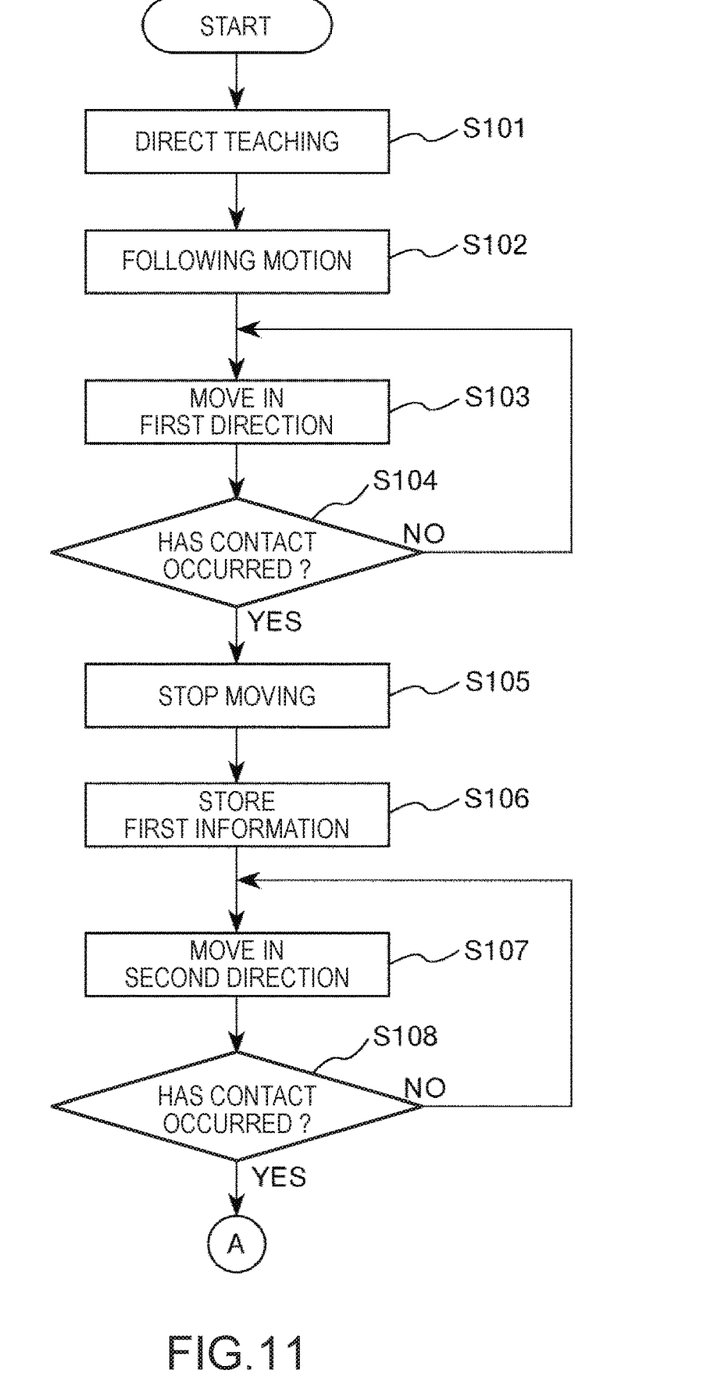
FIG. 11 shows a flowchart showing control actions of a controller and work of an operator in the teaching to the robot of the robot system shown in FIG. 1.
Figure 12:
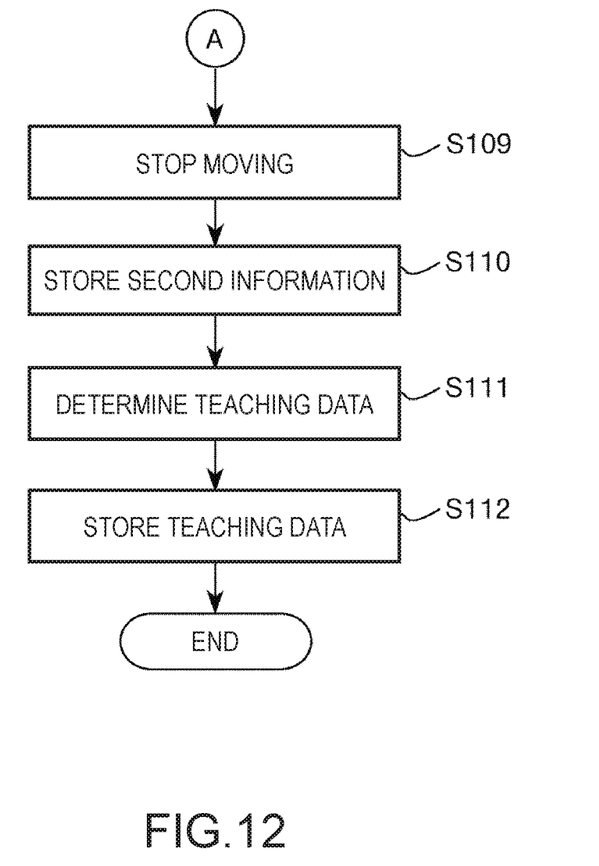
FIG. 12 shows a flowchart showing control actions of the controller and work of the operator in the teaching to the robot of the robot system shown in FIG. 1.

A robot system according to a first embodiment of the invention will first be described. FIG. 1 is a schematic side view showing the robot system according to the first embodiment of the invention. FIG. 2 is a block diagram of the robot system shown in FIG. 1. FIG. 3 is a plan view showing a first target object used in work performed by a robot of the robot system shown in FIG. 1. FIG. 4 is a plan view showing a recess of the first target object and a second target object used in the work performed by the robot of the robot system shown in FIG. 1. FIGS. 5 to 10 each describe teaching to the robot of the robot system shown in FIG. 1. FIGS. 11 and 12 are each a flowchart showing control actions of a controller and work of an operator in the teaching to the robot of the robot system shown in FIG. 1.

In the following description, the upward side in FIGS. 1, 5, 7, and 9 is called "upward," and the downward side therein is called "downward" for ease of description. Further, the side facing a base in FIG. 1 is called a "basal end," and the side opposite the basal side (side facing hand) is called a "distal end."

In FIG. 1, an x axis, a y axis, and a z axis are drawn as three axes perpendicular to one another for ease of description. In the present embodiment, the x, y, and z axes shown in FIG. 1 show a basic coordinate system. It is assumed that the x and y axes of the basic coordinate system are parallel to two edges of the first target object (two edges of bottom surface of each recess of first target object), and that the z axis of the basic coordinate system is perpendicular to the bottom surface of each recess of the first target object. In the following description, the direction parallel to the x axis is also called an "x-axis direction," the direction parallel to the y axis is also called a "y-axis direction," and the direction parallel to the z axis is also called a "z-axis direction." Further, in the following description, the distal end side and the basal end side of each arrow of shown in the drawings are called a "+ (positive) side" and a "− (negative) side," respectively, the direction parallel to the +x-axis direction is also called an "+x-axis direction," the direction parallel to the −x-axis direction is also called an "−x-axis direction," the direction parallel to the +y-axis direction is also called a "+y-axis direction," the direction parallel to the −y-axis direction is also called a "−y-axis direction," the direction parallel to the +z-axis direction is also called a "+z-axis direction," and the direction parallel to the −z-axis direction is also called a "−z-axis direction."

The upward/downward direction in FIG. 1 is called a "vertical direction," and the rightward/leftward direction in FIG. 1 is called a "horizontal direction." In the present specification, the term "horizontal" includes inclination with respect to the horizontal direction by an angle smaller than or equal to 5°. Similarly, in the present specification, the term "vertical" includes inclination with respect to the vertical direction by an angle smaller than or equal to 5°.

Figure 5:
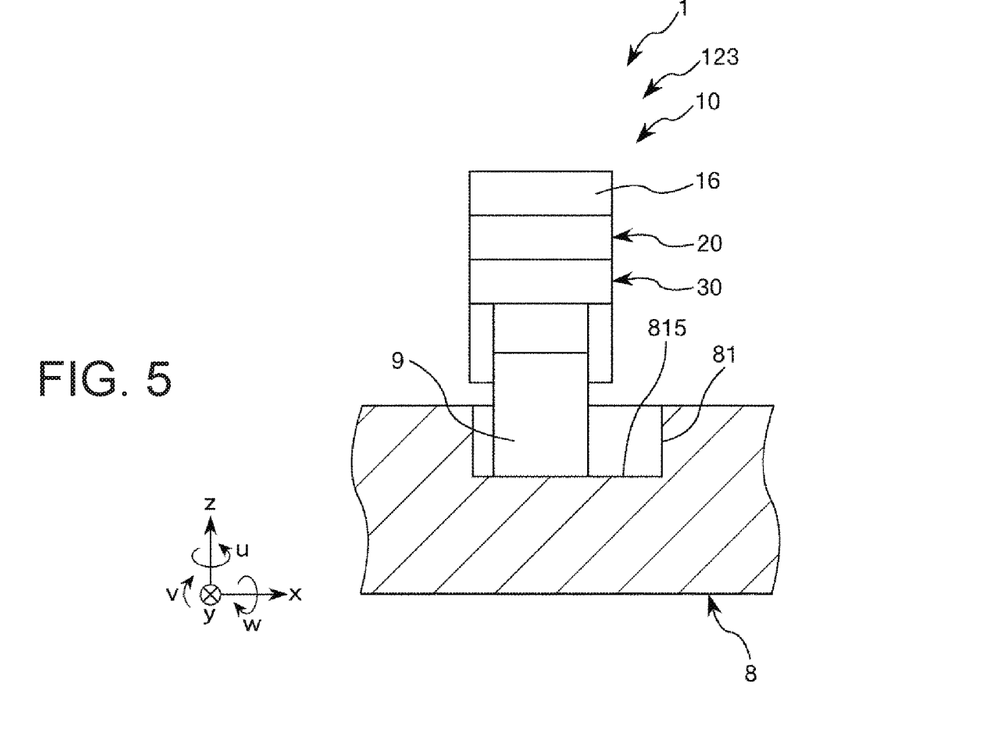
FIG. 5 describes teaching to the robot of the robot system shown in FIG. 1.
Figure 6:
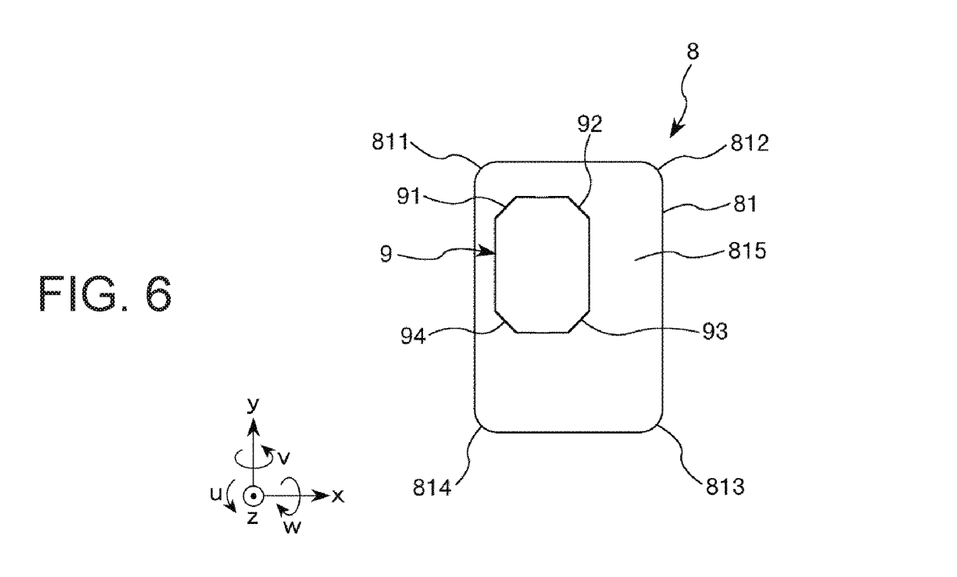
FIG. 6 describes the teaching to the robot of the robot system shown in FIG. 1.
Figure 7:
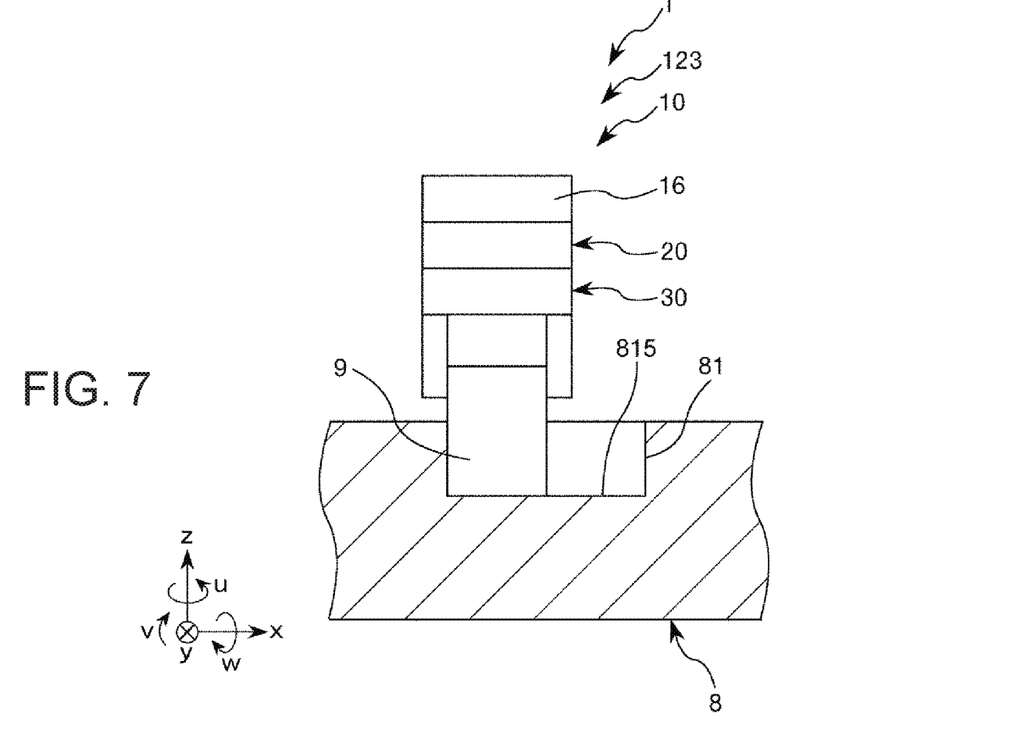
FIG. 7 describes the teaching to the robot of the robot system shown in FIG. 1.
Figure 9:
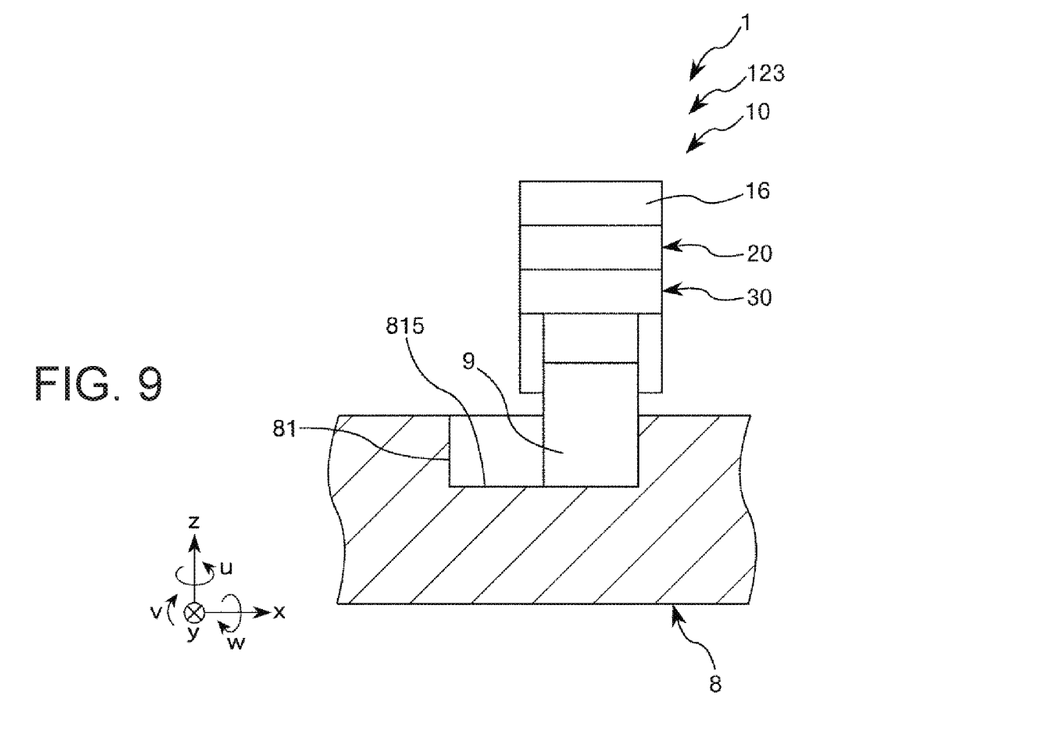
FIG. 9 describes the teaching to the robot of the robot system shown in FIG. 1.
Figure 14:
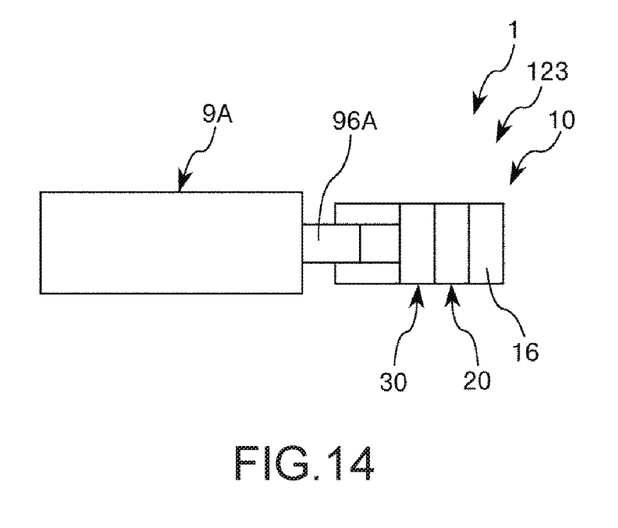
FIG. 14 is a side view showing a state in which the hand of the robot grasps the second target object in the robot system according to the third embodiment of the invention.

In FIGS. 5, 7, and 9, only a sixth arm and a hand of the robot are shown (the same holds true for FIG. 14).

A robot system 100 shown in FIG. 1 includes a robot 1 and a controller 5, which controls the robot 1. The robot system 100 can be used, for example, in a manufacturing step of manufacturing a precision instrument, such as a wristwatch and a mobile phone, parts of the precise instrument, and other components.

Robot

In the present embodiment, the robot 1 performs work of grasping a first target object 9 with a hand 30, which will be described later, and placing the first target object 9 in a central portion of a recess 81, which will be described later, of a second target object 8 and work of grasping the first target object 9 placed in the central portion of the recess 81 with the hand 30 and removing the first target object 9 from the recess 81.

The robot 1 is a six-axis vertical multi-joint robot. The robot 1 includes a base 110, a movable section 123, and a force detecting section 20, with which the movable section 123 is provided. The movable section 123 includes a robot arm (manipulator) 10, which is connected to the base 110, and the hand 30, which is an example of an end effector. The force detecting section 20 is provided at a distal end portion of the robot arm 10, and the hand 30 is provided at a distal end of the force detecting section 20. That is, the force detecting section 20 is disposed between the distal end portion of the robot arm 10 and the basal end portion of the hand 30. The robot 1 further includes a plurality of drive sources 130 and a plurality of motor drivers 120, as shown in FIG. 2.

In the present embodiment, the robot 1 is installed on a work surface 710, which is the upper surface of a workbench 71, which is installed at an installation location 70, for example, a floor. The workbench 71 is so installed that the work surface 710 is parallel to the horizontal plane.

The robot arm 10 includes a first arm 11 (arm), a second arm 12 (arm), a third arm 13 (arm), a fourth arm 14 (arm), a fifth arm 15 (arm), and a sixth arm 16 (arm). The first arm 11, the second arm 12, the third arm 13, the fourth arm 14, the fifth arm 15, and the sixth arm 16 are linked to each other in this order from the basal end side toward the distal end side. The first arm 11 is connected to the base 110, which is attached to the work surface 710.

The base 110 and the first arm 11 are linked to each other via a joint, and the first arm 11 is pivotable relative to the base 110 around a first pivotal axis O1 along the vertical direction. The first arm 11 and the second arm 12 are linked to each other via a joint, and the second arm 12 is pivotable relative to the first arm 11 around a second pivotal axis O2 along the horizontal direction. The second arm 12 and the third arm 13 are linked to each other via a joint, and the third arm 13 is pivotable relative to the second arm 12 around a third pivotal axis O3 along the horizontal direction. The third arm 13 and the fourth arm 14 are linked to each other via a joint, and the fourth arm 14 is pivotable relative to the third arm 13 around a fourth pivotal axis O4 perpendicular to the third pivotal axis O3. The fourth arm 14 and the fifth arm 15 are linked to each other via a joint, and the fifth arm 15 is pivotable relative to the fourth arm 14 around a fifth pivotal axis O5 perpendicular to the fourth pivotal axis O4. The fifth arm 15 and the sixth arm 16 are linked to each other via a joint, and the sixth arm 16 is pivotable relative to the fifth arm 15 around a sixth pivotal axis O6 perpendicular to the fifth pivotal axis O5.

A drive source 130, which includes a motor, such as a servo motor, and a speed reducer, is provided in each of the joint between the base 100 and the first arm 11, the joint between the first arm 11 and the second arm 12, the joint between the second arm 12 and the third arm 13, the joint between the third arm 13 and the fourth arm 14, the joint between the fourth arm 14 and the fifth arm 15, and the joint between the fifth arm 15 and the sixth arm 16 (see FIG. 2). That is, the robot 1 includes the drive sources 130, the number of which is equal to the number of the arms 11 to 16 (six in the present embodiment). The robot 1 further includes motor drivers 120, the number of which is equal to the number of the arms 11 to 16 (six in the present embodiment). The arms 11 to 16 is controlled by the controller 5 via the motor drivers 120 electrically connected to the corresponding drive sources 130. In the following description, the joints described above are also called the "joints of the arms 11 to 16."

The drive sources 130 are each provided with an angle sensor (not shown), for example, an encoder. The angle of rotation of the rotating shafts of the motor or the speed reducer provided in each of the drive sources 130 can therefore be detected.

The force detecting section 20 is removably attached to a distal end portion of the sixth arm 16, as shown in FIG. 1. The force detecting section 20 is a force detector that detects force and moment acting on the hand 30 (movable section 123). In the present embodiment, a six-axis force sensor capable of detecting six components, translational force components Fx, Fy, and Fz in the axial directions of the three axes perpendicular to one another and torque components (moment) Mx, My, and Mz around the three axes, is used as the force detecting section 20.

The hand 30 is removably attached to a distal end portion of the force detecting section 20, as shown in FIG. 1.

Controller

In the present embodiment, the controller 5 is installed at the installation location 70 and located below the workbench 71, as shown in FIG. 1. The controller 5 can be formed, for example, of a personal computer (PC) having a built-in CPU (central processing unit) and memories, such as a ROM (read only memory) and a RAM (random access memory).

The controller 5 includes a control section 51 and a storage section 53, as shown in FIG. 2.

The control section 51 is formed, for example, of a CPU and controls each portion that forms the robot 1, for example, drives the drive sources 130, which are responsible for driving operation of the arms 11 to 16, and drives a drive source (not shown) responsible for driving operation of the hand 30. For example, the control section 51 can drive and stop the arms 11 to 16 and the hand 30 independently of one another on the basis of outputs from the angle sensors (not shown) provided in the force detecting section 20 and the drive sources 130, that is, detection results (signals) outputted from the angle sensors.

The control section 51 further performs each type of control in teaching to the robot 1, which will be described later. For example, in the teaching to the robot 1, the control section 51 evaluates whether or not portions that will be described later have come into contact with each other on the basis of an output from the force detecting section 20, that is, a detection result (signal) outputted from the force detecting section 20 to sense that the portions described above have come into contact with each other. The control section 51 then generates data on the teaching to the robot 1 (movable section 123). The teaching data used herein is data for teaching the robot 1 actions that the robot 1 should take.

The storage section 53 is formed, for example, of a memory and stores a program, data, results of detection performed by the detecting portions, and other pieces of information that allow the controller 5 to perform each type of control (processing).

The controller 5 is so configured as to be separate from the robot 1 in the present embodiment. In this case, for example, the robot 1 and the controller 5 may be connected to each other via a cable (wiring) so that they communicate with each other over wired communication, or the cable described above may be omitted and the robot 1 and the controller 5 may wirelessly communicate with each other.

The controller 5 is not necessarily so configured as to be separate from the robot 1, and part or entirety of the controller 5 may be built in the robot 1. In this case, for example, the controller 5 can be built in the base 110 of the robot 1.

A display device 45, which includes a monitor having a screen, and an input device 46, such as a mouse and a keyboard, are connected (including wireless communication) to the controller 5. A touch panel or any other component may instead be connected to the controller 5.

A basic configuration of the robot system 100 has been briefly described above.

The robot 1 in the robot system 100 performs work of grasping the first target object 9 with the hand 30 and placing the first target object 9 in a central portion of a recess 81 of the second target object 8 and work of grasping the first target object 9 placed in the central portion of the recess 81 with the hand 30 and removing the first target object 9 from the recess 81. In the present embodiment, the placement of the first target object 9 in a recess 81 will be described with reference to a case where the center of the first target object 9 coincides with the center of the recess 81 in a plan view of the second target object 9 (recess 81) and one edge of the first target object 9 is parallel to one edge of the recess 81.

In the work described above, the controller 5 controls the robot 1 and teaches the robot 1 actions in the work (performs teaching to robot 1). The teaching to the robot 1 performed by the controller 5 will be described below.

An example of the second target object 8 and the first target object 9 will first be described. The second target object 8 will be described with reference to a state in which the second target object 8 is placed on the work surface 710 of the workbench 71, and the first target object 9 will be described with reference to a state in which the first target object 9 is properly disposed in a recess 81 of the second target object 8.

The second target object 8 is a pallet and includes the recesses 81, as shown in FIGS. 3 and 4. The second target object 8 includes a plurality of recesses 81, specifically, 16 recesses 81 in the present embodiment. In the present embodiment, the work using the pallet can be readily, quickly, and precisely taught to the robot. The recesses 81 are arranged in a matrix formed of four columns in the longitudinal direction (upward/downward direction in FIG. 3) and four rows in the lateral direction (rightward/leftward direction in FIG. 3). The recesses 81 are arranged at equal intervals in the longitudinal direction and at equal intervals in the lateral direction.

The second target object 8 has a quadrangular (oblong) outer shape in the plan view (outer shape viewed in z-axis direction). The outer shape of each of the recesses 81 in the plan view, that is, the shape of a bottom surface 815 of each of the recesses 81 is a quadrangular (oblong) shape, and the quadrangular shape of each of the recesses 81 has rounded corners 811, 812, 813, and 814. Further, the recesses 81 are so arranged that one edge of a recess 81 is parallel to the corresponding one edge of another and the one edges of the recesses 81 are parallel to one edge of the outer shape of the second target object 8.

An example of the first target object 9 may include a part. The shape of the first target object 9 in the plan view is a quadrangular (oblong) shape, and the quadrangular shape of the first target object 9 has chamfered corners 91, 92, 93, and 94.

Data on the dimensions of the second target object 8 and the first target object 9 are stored in advance in the storage section 53 of the controller 5.

The teaching to the robot 1 performed by the controller 5 (control action in teaching) will next be described with reference to FIGS. 3 to 10 and the flowcharts of FIGS. 11 and 12.

[1] Direct Teaching (Step S101)

In the teaching to the robot 1, direct teaching is first performed (step S101), as shown in FIGS. 11 and 12.

In the direct teaching, the hand 30 of the robot 1 is caused to grasp the first target object 9, and in this state, the operator directly holds the robot arm 10 (movable section 123) with a hand and inserts the first target object 9 in a recess 81 of the second target object 8. The controller 5 knows the position of the first target object 9 (position of center thereof) and posture thereof in the state in which the hand 30 grasps the first target object 9. The first target object 9 may be a target object used in actual work or a target object dedicated to the teaching. Further, in this stage, the first target object 9 is not in contact with the bottom surface 815 of the recess 81 but may instead be in contact therewith.

Data on the posture of the movable section 123 and the position of the distal end portion (tool center point (TCP), for example) of the movable section 123 in the state in which the first target object 9 is inserted into the recess 81, for example, data on the angles of the joints of the arms 11 to 16 are stored as the teaching data in the storage section 53. In this case, the teaching data are automatically stored by the operator's manual operation of the controller 5 using the input device 46 or any other device. An example of the tool center point is the center of the distal end of the hand 30.

Further, the force detecting section 20 is reset. The resetting of the force detecting section 20 is preferably performed before the first target object 9 is inserted into the recess 81 of the second target object 8. The direct teaching is thus completed.

The movable section 123 is thus moved by the direct teaching performed on the robot 1, as described above. The control section 51 then causes the movable section 123 to cause a first portion of the first target object 9 to approach the second target object 8. That is, a following motion, which will be described later, is performed. The direct teaching described above allows easy, quick, precise teaching of the action of inserting the first target object 9 grasped by the hand 30 into the recess 81.

[2] Following Motion (Step S102)

The control section 51 causes the movable section 123 to cause the first portion of the first target object 9 to approach the second target object 8, senses that the first portion of the first target object 9 has come into contact with the second target object 8 on the basis of an output from the force detecting section 20, then causes the movable section 123 to cause a second portion of the first target object 9 to approach the second target object 8, and senses that the second portion of the first target object 9 has come into contact with the second target object 8 on the basis of an output from the force detecting section 20.

The first portion of the first target object 9 is, for example, a predetermined edge or a predetermined corner of the lower surface of the first target object 9.

In the case where the first portion of the first target object 9 is the edge described above, the second portion of the first target object 9 is, for example, edges that form the lower surface of the first target object 9 but differ from the edge described above. In this case, causing the edges different from the edge described above to come into contact with the second target object 8 allows the four edges to come into contact with the second target object 8.

In the case where the first portion of the first target object 9 is the corner described above, the second portion of the first target object 9 is, for example, the four edges of the lower surface of the first target object 9. In this case, for example, a predetermined one of the four edges is first caused to come into contact with the second target object 8, and edges different from the predetermined edge are then caused to come into contact with the second target object 8. The four edges thus come into contact with the second target object 8.

Specifically, the control section 51 causes the first target object 9 to move in the −z-axis direction, which is the direction in which the first target object 9 approaches the bottom surface 815 of the recess 81, and causes the movable section 123 to perform a following motion in which the first target object 9 follows the bottom surface 815 of the recess 81, which is an example of a predetermined surface of the second target object 8. In the following motion, for example, the lower surface of the first target object 9 is pressed against the bottom surface 815 of the recess 81 with predetermined force under impedance control. The entire lower surface of the first target object 9 thus comes into contact with the bottom surface 815 of the recess 81. The z-axis-direction position of the center of the first target object 9 (z0: z coordinate), the angle of rotation of the first target object 9 around the x axis (w0), and the angle of rotation of the first target object 9 around the y axis (v0) in this state are then stored as third information in the storage section 53. The control section 51 then performs first control, which will be described later. It is noted that z0 is information on the position of the first target object 9, and that w0 and v0 are information on the posture of the first target object 9.

[3] First Control (Steps S103 to S106)

The control section 51 performs first control of causing the movable section 123 to move in a first direction along the bottom surface 815 of the recess 81, which is an example of the predetermined surface of the second target object 8, sensing that the corner 811 (first corner), which is an example of a first portion of the second target object 8, has come into contact with the corner 91 (first corner), which is an example of a third portion of the first target object 9 grasped by the movable section 123, on the basis of an output from the force detecting section 20, and storing first information containing a first position where the first target object 9 is located when the contact is sensed in the storage section 53. The first information may further contain a first posture taken by the first target object 9 when the contact described above is sensed. A specific example of the first control will be described below.

Figure 8:
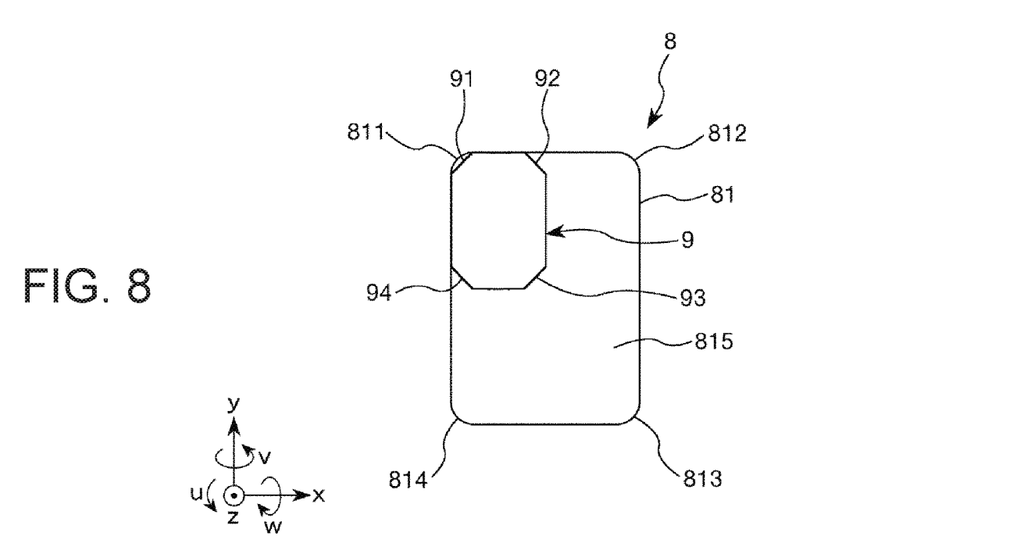
FIG. 8 describes the teaching to the robot of the robot system shown in FIG. 1.

In the first control, the first target object 9 is first moved in the first direction along the bottom surface 815 of the recess 81 (step S103) until the corner 91 of the first target object 9 comes into contact with (is pressed against) the corner 811 of the recess 81, as shown in FIGS. 7 and 8. The first direction is parallel to the bottom surface 815 of the recess 81 in the present embodiment. The phrase "the corner 91 comes into contact with the corner 811 of the recess 81" can be replaced with a phrase "the two edges that sandwich the corner 91 of the first target object 9 come into contact with the two edges that sandwich the corner 811 of the recess 81."

It can therefore be said that the first portion of the second target object 8 is a first side surface of the recess 81, and that the first side surface is one of the two edges that sandwich the corner 811 of the recess 81.

It can also be said that the third portion of the first target object 9 is a first side surface of the first target object 9, and that the first side surface is one of the two edges that sandwich the corner 91 of the first target object 9.

As a result, the x-axis-direction position of the second target object 8, the y-axis-direction position of the second target object 8, and the angle of rotation of the second target object 8 around the z axis are defined in the state in which the two edges that sandwich the corner 91 of the first target object 9 are in contact with the two edges that sandwich the corner 811 of the recess 81, whereby the teaching can be precisely performed.

It can also be said that the second target object 8 has recesses 81 each having an inner side surface having a first corner and a second corner different from the first corner, and that the first portion of the second target object 8 is the first corner and the first corner is the corner 811 of the recess 81.

It can also be said that the first target object 9 has an outer side surface having a first corner and a second corner different from the first corner, and that the third portion of the first target object 9 is the first corner and the first corner is the corner 91 of the first target object 9.

As a result, the x-axis-direction position of the second target object 8, the y-axis-direction position of the second target object 8, and the angle of rotation of the second target object 8 around the z axis are defined in the state in which the corner 91 of the first target object 9 is in contact with the corner 811 of the recess 81, whereby the teaching can be precisely performed.

Subsequently, after step S103, it is evaluated on the basis of a detection result outputted from the force detecting section 20 whether or not the corner 91 of the first target object 9 has come into contact with the corner 811 of the recess 81 (step S104), and in a case where it is determined that the contact has not occurred, the control returns to step S103, and step S103 and the following steps are carried out again.

In a case where it is determined in step S104 that the contact has occurred, the first target object 9 is caused to stop moving (step S105).

The x-axis-direction position of the center of the first target object 9 (x1: x coordinate), the y-axis-direction position of the center of the first target object 9 (y1: y coordinate), and the angle of rotation of the first target object 9 around the z axis (u1) in this state are then stored as the first information in the storage section 53 (step S106). It is noted that x1 and y1 are information on the first position of the first target object 9, and that u1 is information on the first posture of the first target object 9.

[4] Second Control (Steps S107 to S110)

The control section 51 performs second control of causing the movable section 123 to move in a second direction different from the first direction along the bottom surface 815 of the recess 81, which is an example of the predetermined surface of the second target object 8, sensing that the corner 813 (second corner), which is an example of a fourth portion of the second target object 8, has come into contact with the corner 93 (second corner), which is an example of a second portion of the first target object 9 grasped by the movable section 123, on the basis of an output from the force detecting section 20, and storing second information containing a second position where the first target object 9 is located when the contact is sensed in the storage section 53. The second information may further contain a second posture taken by the first target object 9 when the contact described above is sensed. A specific example of the second control will be described below.

Figure 10:
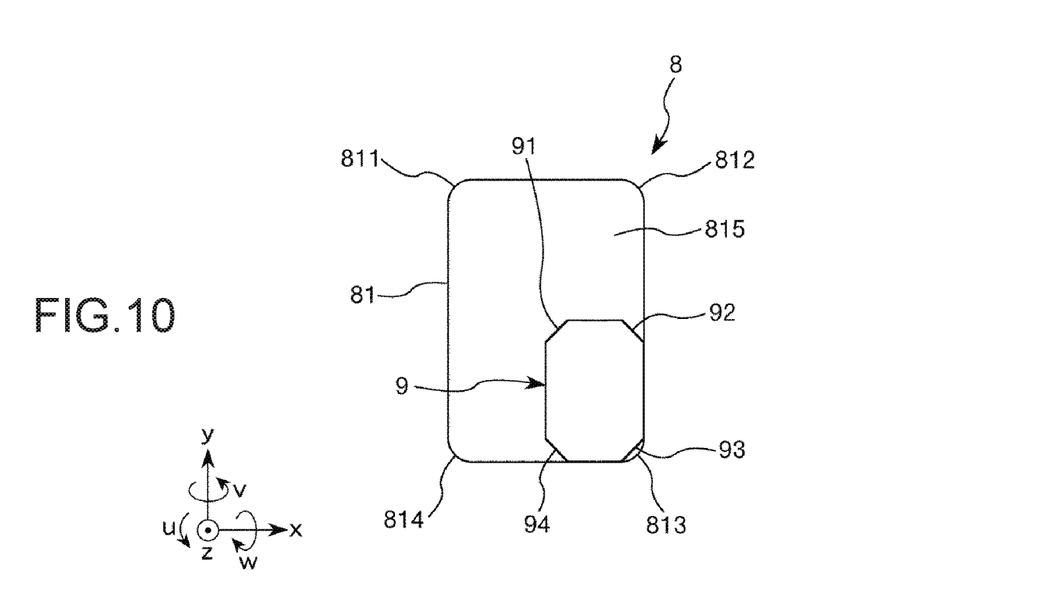
FIG. 10 describes the teaching to the robot of the robot system shown in FIG. 1.

In the second control, the first target object 9 is first moved in a direction different from the first direction, specifically, in the second direction opposite the first direction in the present embodiment, along the bottom surface 815 of the recess 81 (step S107) until the corner 93 of the first target object 9 comes into contact with (is pressed against) the corner 813 of the recess 81, as shown in FIGS. 9 and 10. The second direction is parallel to the bottom surface 815 of the recess 81 in the present embodiment. The phrase "the corner 93 comes into contact with the corner 813 of the recess 81" can be replaced with a phrase "the two edges that sandwich the corner 93 of the first target object 9 come into contact with the two edges that sandwich the corner 813 of the recess 81."

It can therefore be said that the fourth portion of the second target object 8 is a second side surface of the recess 81 that differs from the first side surface of the recess 81, and that the second side surface is one of the two edges that sandwich the corner 813 of the recess 81.

It can also be said that the second portion of the first target object 9 is a second side surface of the first target object 9 that differs from the first side surface of the first target object 9, and that the second side surface is one of the two edges that sandwich the corner 93 of the first target object 9.

As a result, the x-axis-direction position of the second target object 8, the y-axis-direction position of the second target object 8, and the angle of rotation of the second target object 8 around the z axis are defined in the state in which the two edges that sandwich the corner 93 of the first target object 9 are in contact with the two edges that sandwich the corner 813 of the recess 81, whereby the teaching can be precisely performed.

It can also be said that the second target object 8 has recesses 81 each having an inner side surface having a first corner and a second corner different from the first corner, and that the fourth portion of the second target object 8 is the second corner and the second corner is the corner 813 of the recess 81.

It can also be said that the first target object 9 has an outer side surface having a first corner and a second corner different from the first corner, and that the second portion of the first target object 9 is the second corner and the second corner is the corner 93 of the first target object 9.

As a result, the x-axis-direction position of the second target object 8, the y-axis-direction position of the second target object 8, and the angle of rotation of the second target object 8 around the z axis are defined in the state in which the corner 93 of the first target object 9 is in contact with the corner 813 of the recess 81, whereby the teaching can be precisely performed.

Subsequently, after step S107, it is evaluated on the basis of a detection result outputted from the force detecting section 20 whether or not the corner 93 of the first target object 9 has come into contact with the corner 813 of the recess 81 (step S108), and in a case where it is determined that the contact has not occurred, the control returns to step S107, and step S107 and the following steps are carried out again.

In a case where it is determined in step S108 that the contact has occurred, the first target object 9 is caused to stop moving (step S109).

The x-axis-direction position of the center of the first target object 9 (x2: x coordinate), the y-axis-direction position of the center of the first target object 9 (y2: y coordinate), and the angle of rotation of the first target object 9 around the z axis (u2) in this state are then stored as the second information in the storage section 53 (step S110). It is noted that x2 and y2 are information on the second position of the first target object 9, and that u2 is information on the second posture of the first target object 9.

As opposite to the above description, the second control may be performed first, and the first control may then be performed.

Instead, in the first control and the second control, the corner 92 of the first target object 9 may be caused to come into contact with the corner 812 of the recess 81, and the corner 94 of the first target object 9 may be caused to come into contact with the corner 814 of the recess 81.

[5] Step S111

The control section 51 determines (generates) data on the teaching to the movable section 123 on the basis of the first information and the second information (step S111). The teaching data can therefore be readily and precisely determined.

Specifically, on the basis of x1, y1, and u1, which form the first information, x2, y2, and u2, which form the second information, and z0, w0, and v0, which form the third information, the x-axis-direction position of the center of the first target object 9 (x0: x coordinate), the y-axis-direction position of the center of the first target object 9 (y0: y coordinate), the z-axis-direction position of the center of the first target object 9 (z0: z coordinate), the angle of rotation of the first target object 9 around the x axis (w0), the angle of rotation of the first target object 9 around the y axis (v0), and the angle of rotation of the first target object 9 around the z axis (u0), which correspond to the state in which the first target object 9 is so disposed that the center of the first target object 9 coincides with the center of the recess 81 in the plan view of the second target object 8 (recess 81) and one edge of the first target object 9 is parallel to one edge of the recess 81, are determined as the teaching data.

In this case, z0, w0, and v0 in the teaching data are z0, w0, and v0, which form the third information, respectively.

The coordinate x0 in the teaching data is determined on the basis of x1 in the first information and x2 in the second information. Similarly, the coordinate y0 in the teaching data is determined on the basis of y1 in the first information and y2 in the second information. Similarly, the coordinate u0 in the teaching data is determined on the basis of u1 in the first information and u2 in the second information.

[6] Step S112

The control section 51 stores the teaching data generated in step S111 in the storage section (step S112).

The teaching data corresponds to data on the posture of the movable section 123 and the position of the distal end portion (tool center point (TCP), for example) of the movable section 123 in the state in which the first target object 9 grasped by the hand 30 is so disposed that the center of the first target object 9 coincides with the center of the recess 81 in the plan view of the second target object 8 (recess 81) and one edge of the first target object 9 is parallel to one edge of the recess 81. For example, the teaching data corresponds to data on the angles of the joints at the arms 11 to 16.

The processes [1] to [6] described above are carried out for each of the recesses 81.

[7] Setting Local Coordinates

The control section 51 has the function of setting a local coordinate system. The control section 51 sets as required a local coordinate system having the Z axis shown in FIG. 3, which is an example of an axis perpendicular to the predetermined surface of the second target object 8.

That is, the controller 5 sets as required a local coordinate system formed of three axes (X axis, Y axis, and Z axis) perpendicular to one another (see FIG. 3). The X and Y axes of the local coordinate system are parallel to two edges of the quadrangular second target object 8 (two edges of quadrangular shape of recess 81), and the Z axis is perpendicular to the bottom surface 815 of a recess 81. The robot can therefore be readily controlled in actual work. Further, also in the following teaching to the robot 1, the robot can be readily controlled.

The local coordinate system can be set, for example, after the first control, after the second control, or after step S111.

As described above, according to the controller 5, the teaching to the robot 1 can be readily, quickly, and precisely performed.

Further, even in a case where the distance from the first target object 9 to the recesses 81 of the second target object 8 is small, or even in a case where there is no space for visual inspection, the teaching can be performed.

The robot 1 can therefore precisely performs work.

Variation 1

In the first embodiment, the recesses 81 of the second target object 8 and the first target object 9 each have a quadrangular shape in the plan view, but not necessarily. Examples of other shapes of the recesses 81 of the second target object 8 and the first target object 9 may include a triangular shape, a pentagonal shape, a hexagonal shape, and other polygonal shapes, a circular shape, and an elliptical shape in the plan view.

For example, in a case where the recesses 81 each have a circular shape in the plan view, the first target object is moved in a recess 81 in four radial directions perpendicular to one another (positive and negative directions along two diametrical lines perpendicular to each other) for the teaching to the robot 1. In this case, as the first target object 9, it is preferable to use, for example, a target object dedicated to the teaching and having arcs formed of four edges replaced with arcs having the same curvature as that of the arcs of the recesses 81.

Variation 2

In the teaching to the robot 1, the control section 51 of the controller 5 may cause the movable section 123 to cause the first portion of the first target object 9 to approach the second target object 8, sense that the first portion has come into contact with the second target object 8 on the basis of an output from the force detecting section 20, then cause the movable section 123 to cause the second portion of the first target object 9 to approach the second target object 8, sense that the second portion has come into contact with the second target object 8 on the basis of an output from the force detecting section 20, move the movable section 123 in a first direction, sense that a first portion of the movable section 123 has come into contact with the second target object 8 on the basis of an output from the force detecting section 20, store first information containing the first position of the movable section 123 in the storage section 53, move the movable section 123 in a second direction different from the first direction, sense that a second portion of the movable section 123 has come into contact with the second target object 8 on the basis of an output from the force detecting section 20, store second information containing the second position of the movable section 123 in the storage section 53, and determine (generate) teaching data to the movable section 123 on the basis of the first information and the second information stored in the storage section 53. The first information may further contain a first posture taken by the movable section 123 when the contact between the first portion of the movable section 123 and the second target object 8 is sensed. The second information may further contain a second posture taken by the movable section 123 when the contact between the second portion of the movable section 123 and the second target object 8 is sensed.

In Variation 2, the teaching to the robot 1 can be performed with the hand 30 grasping no first target object 9. Variation 2 will not be described in detail because Variation 2 mostly overlaps with the first embodiment. In this case, the following replacement only basically needs to be made in Variation 2: The "first target object 9" in the first embodiment is replaced with the "movable section 123;" the "third portion" in the first embodiment is replaced with the "first portion; " and the "fourth portion" in the first embodiment is replaced with the "second portion."

The first portion and the second portion of the movable section 123 are, for example, two different fingers of the hand 30.

Variations 1 and 2 described above can also provide the same advantageous effects as those provided by the first embodiment described above.

Variations 1 and 2 described above are applicable to other embodiments described below.

Second Embodiment

A second embodiment will be described below. Points different from those in the embodiment described above will be primarily described, and the same items will not be described.

In the robot system 100 according to the second embodiment, the control section 51 of the controller 5 has what is called a palletizing function. The palletizing function will be specifically described below.

The control section 51 of the controller 5 acquires the first information and the second information for at least three of the 16 recesses 81, which are an example of a plurality of recesses 81 of the second target object 8, and determines (generates) teaching data to the movable section 123 on the basis of the acquired first information and second information.

In the present embodiment, the teaching data to the movable section 123 is determined for an upper left recess 81a in FIG. 3, an upper right recess 81b in FIG. 3, and a lower right recess 81c in FIG. 3. The combination of other three recesses 81 or the combination of four or more recesses 81 may instead be used.

The control section 51 then determines teaching data to the movable section 123 for recesses 81 out of the 16 recesses 81 but different from the recesses 81 for which the teaching data to the movable section 123 has been determined, on the basis of the teaching data for the recesses 81 for which the teaching data to the movable section 123 has been determined.

In the present embodiment, the teaching data to the movable section 123 is determined (generated) for recesses 81 out of the 16 recesses 81 but different from the recesses 81a, 81b, and 81c on the basis of the teaching data for the recesses 81a, 81b, and 81c.

In this case, the teaching data for the recesses 81 between the recess 81a and the recess 81b can be determined by using the teaching data for the recess 81a and the teaching data for the recess 81b. The teaching data for the recesses 81 between the recess 81b and the recess 81c can be determined by using the teaching data for the recess 81b and the teaching data for the recess 81c. The teaching data for the remaining recesses 81 can also be determined in the same manner.

The teaching to the robot 1 therefore only needs to be performed for at least three out of the 16 recesses 81, whereby the teaching to the robot 1 can be more readily and quickly performed.

The second embodiment described above can also provide the same advantageous effects as those provided by the embodiment described above.

Third Embodiment

Figure 13:
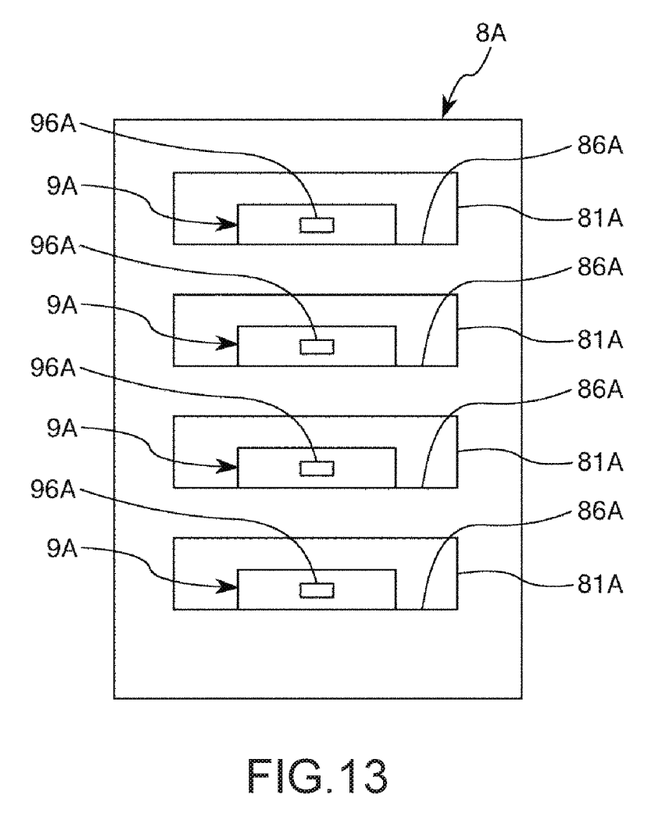
FIG. 13 is a front view showing the first target object and the second target object in a robot system according to a third embodiment of the invention.

FIG. 13 is a front view showing the first target object and the second target object in a robot system according to a third embodiment of the invention. FIG. 14 is a side view showing a state in which the hand of the robot grasps the second target object in the robot system according to the third embodiment of the invention.

The third embodiment will be described below. Points different from those in the embodiments described above will be primarily described, and the same items will not be described.

In the robot system 100 according to the third embodiment, a second target object 8A is a shelf and has a plurality of recesses 81A, specifically, four recesses 81A in the present embodiment. In this case, a predetermined surface which forms the second target object 8A and along which the movable section 123 moves is, for example, a side surface 86A.

A first target object 9A has a protrusion 96A, and the hand 30 of the robot 1 grasps the protrusion 96A.

To teach the robot 1, in the first control and the second control, for example, the first target object 9A is moved in the rightward/leftward direction in FIG. 13, and the first information and the second information are acquired.

The other actions (control) are the same as those in the first embodiment and will not be described.

The third embodiment described above can also provide the same advantageous effects as those provided by the embodiments described above.

The controller, the robot, and the robot system according to the embodiments of the invention have been described above, but the invention is not limited thereto, and the configuration of each portion of the controller, the robot, and the robot system can be replaced with an arbitrary configuration having the same function. Further, other arbitrary configurations can be added to the controller, the robot, and the robot system.

Further, in the embodiments of the invention, arbitrary two or more configurations (features) may be combined with each other.

The above embodiments have been described with reference to the case where the movable section is formed of the robot arms and the end effector (hand), but not necessarily in the invention, and the movable section only needs to be a portion that forms the robot and is movable, that is, a portion that can be moved. As another specific example, the movable section may further include a part (member) in addition to the robot arms and the end effector. Further, for example, the portion formed of the robot arms, the force detecting section, and the end effector may be taken as the movable section, the robot arms may be taken as the movable section, the end effector may be taken as the movable section, or an arbitrary arm out of the first to sixth arms may be taken as the movable section.

In the embodiments described above, the location where the base of the robot is installed is a workbench, but not necessarily in the invention, and in addition to the workbench, a floor, a ceiling, a wall, the ground, the upper surface of a movable cart, and other objects are conceivable as the installation location.

In the embodiments of the invention, the robot may be installed in a cell. In this case, examples of the location where the base of the robot is installed may include, for example, a floor portion, a ceiling portion, a wall portion, and a workbench of the cell.

In the embodiments described above, the installation surface that is a flat surface (surface) on which the robot (base) is installed is a flat surface (surface) parallel to the horizontal plane, but not necessarily in the invention, and the installation surface may, for example, be a flat surface (surface) inclining with respect to the horizontal plane or the vertical plane or a flat surface (surface) parallel to the vertical plane.

In the embodiments described above, the number of pivotal axes of the robot arms is six, but not necessarily in the invention, and the number of pivotal axes of the robot arms may, for example, be two, three, four, five, or seven or greater. That is, in the embodiments described above, the number of arms (links) is six, but not necessarily in the invention, and the number of arms may be two, three, four, five, or seven or greater. In this case, for example, in the robot according to any of the embodiments described above, adding an arm in a position between the second arm and the third arm allows a robot having seven arms to be achieved.

In the embodiments described above, the number of robot arms is one, but not necessarily in the invention, and the number of robot arms may, for example, be two or greater. That is, the robot (robot main body) may, for example, be a multi-arm robot, such as a double-arm robot.

In the embodiments of the invention, the robot may be a robot based on another form. Specific examples may include a leg walking (traveling) robot having legs or a horizontal multi-joint robot, such as a SCARA robot.

The above embodiments have been described with reference to the case where a six-axis force sensor is used as the force detecting section, but not necessarily in the invention, and a force sensor having another configuration may be used as the force detecting section in accordance with the configuration of the robot, the content of work, the shapes of the first and second target objects, and other factors.

The above embodiments have been described with reference to the case where the force detecting section is provided at the distal end portion of one of the robot arms, but not necessarily in the invention, and the force detecting section may be installed at any location where force or moment acting on the movable section can be detected. For example, the force detecting section may be provided at a proximal end portion of the sixth arm (between fifth arm and sixth arm).

In the embodiments described above, the end effector is the hand, but not necessarily in the invention, and the end effector may be any portion capable of grasping a target object, for example, a portion configured to suck and grasp a target object (suck and grasp).

In the embodiments described above, the storage section is a component of the controller, but not necessarily in the invention, and the storage section may not be a component of the controller.

In the embodiments described above, the first target object is a pallet or a shelf, but not necessarily in the invention.

The entire disclosure of Japanese Patent Application No. 2016-180254, filed Sep. 15, 2016 is expressly incorporated by reference herein.

What is claimed is:

1. A controller comprising:
a processor that is configured to execute computer-executable instruction so as to control a robot including a movable section and a force detecting section provided in the movable section,
wherein the processor is configured to cause the movable section to cause a first portion of a first target object to approach a second target object, sense that the first portion has come into contact with the second target object based on an output from the force detecting section, then cause the movable section to cause a second portion of the first target object to approach the second target object, and sense that the second portion has come into contact with the second target object based on an output from the force detecting section, cause the movable section to move in a first direction, sense that a third portion of the first target object has come into contact with the second target object based on an output from the force detecting section, store first information containing a first position of the first target object in a storage section, cause the movable section to move in a second direction different from the first direction, sense that a fourth portion of the first target object has come into contact with the second target object based on an output from the force detecting section, store second information containing a second position of the first target object in the storage section, and generate data on teaching to the movable section based on the first information and the second information stored in the storage section.

2. The controller according to claim 1, wherein the second direction is a direction opposite the first direction.

3. A robot that is controlled by the controller according to claim 2 and includes the movable section and the force detecting section.

4. A robot system comprising:
the controller according to claim 2; and
the robot controlled by the controller and including the movable section and the force detecting section.

5. The controller according to claim 1, wherein during the movement of the movable section in the first direction, the first portion and the second portion are in contact with the second target object.

6. A robot that is controlled by the controller according to claim 5 and includes the movable section and the force detecting section.

7. A robot system comprising:
the controller according to claim 5; and
the robot controlled by the controller and including the movable section and the force detecting section.

8. The controller according to claim 1, wherein the second target object is a pallet.

9. The controller according to claim 1, wherein the third portion of the first target object is a first side surface of the first target object.

10. The controller according to claim 9, wherein the fourth portion of the first target object is a second side surface of the first target object that differs from the first side surface of the first target object.

11. The controller according to claim 1,
wherein the second target object has a recess having an inner side surface having a first corner and a second corner different from the first corner,
the portion which forms the second target object and with which the third portion comes into contact is the first corner, and
the portion which forms the second target object and with which the fourth portion comes into contact is the second corner.

12. The controller according to claim 11,
wherein the first target object has an outer side surface having a first corner and a second corner different from the first corner,
the third portion of the first target object is the first corner, and
the fourth portion of the first target object is the second corner.

13. The controller according to claim 1,
wherein the second target object has a plurality of recesses, the processor is configured to acquire the first information and the second information for at least three of the plurality of recesses and generates teaching data to the movable section based on the first information and second information, and generate teaching data to the movable section for recesses out of the plurality of recesses but different from the recesses for which the teaching data to the movable section has been determined, on the basis of the teaching data for the recesses for which the teaching data to the movable section has been determined.

14. The controller according to claim 1, wherein the processor is configured to set a local coordinate system having an axis perpendicular to a predetermined surface of the second target object.

15. The controller according to claim 1, wherein the processor is configured to cause the movable section to cause the first portion to approach the second target object after direct teaching is so performed on the robot that the movable section is moved.

16. A robot that is controlled by the controller according to claim 1 and includes the movable section and the force detecting section.

17. A robot system comprising:
the controller according to claim 1; and
the robot controlled by the controller and including the movable section and the force detecting section.

18. A controller comprising:
a processor that is configured to execute computer-executable instruction so as to control a robot including a movable section and a force detecting section provided in the movable section,
wherein the processor is configured to cause the movable section to cause a first portion of a first target object to approach a second target object, sense that the first portion has come into contact with the second target object based on an output from the force detecting section, then cause the movable section to cause a second portion of the first target object to approach the second target object, sense that the second portion has come into contact with the second target object based on an output from the force detecting section, move the movable section in a first direction, sense that a first portion of the movable section has come into contact with the second target object based on an output from the force detecting section, store first information containing a first position of the movable section in a storage section, move the movable section in a second direction different from the first direction, sense that a second portion of the movable section has come into contact with the second target object based on an output from the force detecting section, store second information containing a second position of the movable section in the storage section, and generate teaching data to the movable section based on the first information and the second information stored in the storage section.

19. A robot that is controlled by the controller according to claim 18 and includes the movable section and the force detecting section.

20. A robot system comprising:
the controller according to claim 18; and
the robot controlled by the controller and including the movable section and the force detecting section.

* * * * *